(No Model.)
E. W. BEGBIE.
HELIOTROPE.
No. 254,790. Patented Mar. 14, 1882.
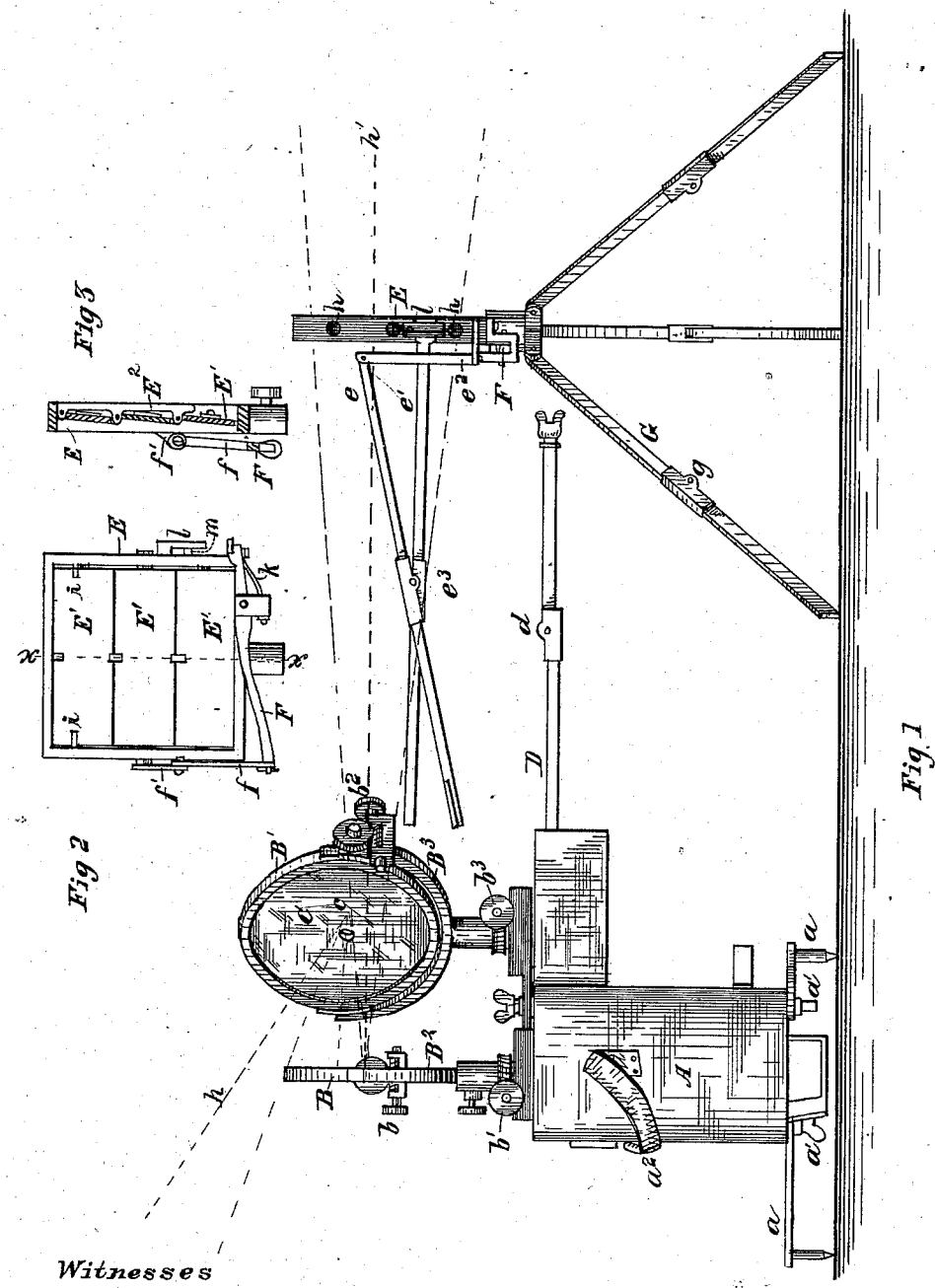
Witnesses
W. C. Collies
James L. Baird
Inventor
Elphinstone Begbie
By George P. Barton
Attorney

UNITED STATES PATENT OFFICE.

ELPHINSTONE W. BEGBIE, OF BANGALORE, INDIA.

HELIOTROPE.

SPECIFICATION forming part of Letters Patent No. 254,790, dated March 14, 1882.

Application filed January 4, 1881. (No model.)

*To all whom it may concern:*

Be it known that I, ELPHINSTONE WATERS BEGBIE, of Bangalore, India, have discovered certain new and useful Improvements in Sun-Flashing Instruments, of which the following is such a full, clear, concise, and exact description as will enable those skilled in the art to which my invention appertains to make and use the same, reference being had to the accompanying drawings, forming a part of this specification.

In all sun-flashing signaling instruments of the kind heretofore employed the designers have affixed a key to the mirror, and the flashes are formed by altering the angle of the mirror, and so throwing the flash on or off the station signaled. In my heliotrope, however, the flash from the mirror is kept steadily directed on the distant station, and is obscured or displayed at pleasure by means of a shutter independent of the body of the instrument. This I believe to be the only correct principle for a sun-flashing signaling-instrument, for the flash obtained from a mirror being a reflection of the solar image, its greatest intensity lies along the axis of the cone of light, and the object therefore to be secured is to direct this axis on the distant station. An operator with my heliotrope has only to adjust the mirror so as to throw the shadow from the plug, marking the center of the glass on the silvered sighting-disk, and he has the absolute guarantee that the maximum flash obtainable from the mirror is being kept constantly and steadily directed on the distant station. The signaling arrangements in the heliotrope—that is, the shutter—being quite separate from the source of light—that is, the mirrors—enables me to reduce all parts to the lightest dimensions—a very great consideration from a military point of view. In all sun-flashing instruments heretofore employed the operator has to stand, as in order to get the stability necessary to prevent the alignment being disturbed by the working of the key the mirror has been mounted on a heavy tripod. In my heliotrope, however, the mirrors being mounted on the box in which they are carried, the operator can sit at his work, and so is less exposed to the fire of an enemy.

Moreover, the instrument is not so much affected by wind, and the consequence is that the flash from the heliotrope is free from that tremor observable in instruments exposed to the wind. These advantages are all substantial improvements on sun-flashing instruments heretofore introduced.

In the drawings, Figure 1 represents a perspective view of my heliotrope. Figs. 2 and 3 are detail views of the shutter.

Like letters of reference indicate like parts.

The body A is supported preferably by the arms $a$, attached thereto by screws $a'$, as shown. Three arms should be used, which are provided with legs, as shown. The mirrors B B' are supported, as shown, by pieces $B^2$ $B^3$.

C is the reflecting-surface of the mirror. Adjusting-screws $b$ $b'$ $b^2$ $b^3$ are provided, as shown.

In the center of each mirror there is an opening for the purpose of taking the alignment, and which may afterward be filled with a plug. The bar D, provided with joint $d$, may be used to support a perforated sighting-disk.

The screen which is supported by the tripod consists of three shutters operated by the mechanism hereinafter described.

The frame E may be of iron or other suitable material, and the three shutters E' are supported in the frame by bearings $h$ $h$. The brace $E^2$ connects the three shutters together, as shown, so that when the middle shutter is moved the other shutters will move with it.

The projections $i$ $i$ serve to arrest the motion of the shutters, as their planes are brought parallel with the direction of the rays of light.

The spring $k$ bears against lever F, as shown. The lower portion, $f$, of the knee-joint is attached to the lever F. The upper portion, $f'$, is attached to the central shutter, and operates like a crank to turn the shutter. The lever $e$ has its fulcrum at $e^3$ upon the arm $e'$. The brace $e^2$ connects lever $e$ with the lever F. The button $l$, when in the position shown, holds the arm $e'$ upon the stud $m$. (See Fig. 2.) On turning the button $l$ upward the arm $e'$ may be easily removed from the stud or shank $m$.

The tripod G, provided with jointed legs $g$, supports the shutter, as shown.

The rays of light from the sun coming in the direction $h$ strike the surface of the first mirror, and are reflected to the other mirror, and thence in direction of dotted line $h'$ toward the distant station, which may be many miles distant. The operator by means of levers $e\ e'$ opens the shutters according to the code or system of signals agreed upon. Thus flashes of a steady blaze of sunlight are sent in the direction $h'$, and are noted by the reader at the distant station, either by the naked eye or with the help of a telescope, according as the distance may be approximately under or over twenty-five miles. Only one mirror is used when the sun is between the operator and the distant station.

Having thus described my invention, what I claim as new, and desire to secure by Letters Patent, is—

The combination of mirrors B and B', each provided with a central opening and a screen, consisting of three shutters, E', connected by brace $E^2$, and mechanism attached to the central shutter, whereby the rays of sunlight may be directed to a distant station and interrupted at the will of the operator, as and for the purpose specified.

In witness whereof I hereunto sign my name in the presence of two subscribing witnesses.

ELPHINSTONE WATERS BEGBIE.

Witnesses:
 CHARLES ALEXANDER SIM,
*Lieut. Colonel, Commandant Sappers and Miners, Bangalore.*
 CHARLES BOYD WILKIESON,
*Lieutenant Royal Engineers, Bangalore.*